(12) United States Patent
Kim et al.

(10) Patent No.: US 9,820,145 B2
(45) Date of Patent: Nov. 14, 2017

(54) REGISTRATION SETTING SUPPORTING METHOD AND ELECTRONIC DEVICE

(71) Applicant: Samsung Electronics Co., Ltd., Gyeonggi-do (KR)

(72) Inventors: Su Hyun Kim, Gyeonggi-do (KR); Hyuk Kang, Gyeonggi-do (KR); Ju Ah Lee, Gyeonggi-do (KR); Jun Hak Lim, Gyeonggi-do (KR); Young Jae Choi, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/974,328

(22) Filed: Dec. 18, 2015

(65) Prior Publication Data

US 2016/0198342 A1 Jul. 7, 2016

(30) Foreign Application Priority Data

Jan. 6, 2015 (KR) ........................ 10-2015-0001457

(51) Int. Cl.
*H04W 12/04* (2009.01)
*H04W 60/04* (2009.01)
*H04W 4/00* (2009.01)
*H04L 9/30* (2006.01)
*H04L 29/06* (2006.01)

(52) U.S. Cl.
CPC ............... *H04W 12/04* (2013.01); *H04L 9/30* (2013.01); *H04L 63/18* (2013.01); *H04W 4/001* (2013.01); *H04W 60/04* (2013.01)

(58) Field of Classification Search
CPC ..... H04W 12/04; H04W 60/04; H04W 4/001; H04L 9/30
See application file for complete search history.

(56) References Cited

U.S. PATENT DOCUMENTS

| 8,930,699 B2 | 1/2015 | Guo et al. |
| 2011/0184586 A1* | 7/2011 | Asano .................... G05B 15/02 700/297 |
| 2013/0091359 A1 | 4/2013 | Guo et al. |
| 2013/0288601 A1 | 10/2013 | Chhabra |

(Continued)

FOREIGN PATENT DOCUMENTS

KR 10-2013-0030691 A 3/2013

*Primary Examiner* — Muthuswamy Manoharan
(74) *Attorney, Agent, or Firm* — Cha & Reiter, LLC

(57) ABSTRACT

A method and electronic device implementing the same are disclosed herein. The electronic device includes a first communication module, a second communication module, a memory, and at least one processor operatively coupled to the memory. The at least one processor implements the method, including: receiving, via a first communication module, an initial setting request message from an external electronic device through a first communication channel, receiving, via a second communication module security key information from the external electronic device through a second communication channel; and transmitting subscription information for communicating with a network provider to the external electronic device, wherein the first communication channel and the second communication channel have different communication characteristics.

12 Claims, 9 Drawing Sheets

(56) References Cited

U.S. PATENT DOCUMENTS

| | | | | |
|---|---|---|---|---|
| 2014/0003340 A1* | 1/2014 | Park | ............... | H04M 1/2535 370/328 |
| 2014/0364056 A1 | 12/2014 | Belk et al. | | |
| 2015/0222615 A1* | 8/2015 | Allain | ............... | H04L 63/08 726/4 |
| 2016/0088465 A1* | 3/2016 | Golla | ............... | H04W 72/0493 455/450 |

* cited by examiner

REGISTRATION SETTING SUPPORTING METHOD AND ELECTRONIC DEVICE

CLAIM OF PRIORITY

This application claims the benefit under 35 U.S.C. §119 (a) of a Korean patent application filed on Jan. 6, 2015 in the Korean Intellectual Property Office and assigned Serial number 10-2015-0001457, the entire disclosure of which is hereby incorporated by reference.

TECHNICAL FIELD

The present disclosure relates to an electronic device registration setting.

BACKGROUND

An electronic device including a communication module may establish a communication channel with a network or another electronic device and perform data transmission/reception. In relation to this, after purchasing an electronic device, a user is required to perform various registration processes relating to configuring a communication channel operation of the electronic device.

Since the registration setting varies according to communication methods, a user is required to understand and execute various configuration settings. Additionally, since procedures for registering with a specific service provider are diverse and complex, users typically experience considerable difficulty while performing the registration setting process.

SUMMARY

Accordingly, an aspect of the present disclosure is to provide a registration setting supporting method for conveniently and simply processing registration of a specified electronic device using another electronic device already having the requisite registration information.

In accordance with an aspect of the present disclosure, an electronic device is disclosed, including: a first communication module, a second communication module, a memory, and at least one processor operatively coupled to the memory, configured to: control the first communication module to receive an initial setting request message from an external electronic device through a first communication channel, control the second communication module to receive security key information from the external electronic device through a second communication channel, store the initial setting request message and the security key information in the memory, and transmit subscription information for communicating with a network provider to the external electronic device.

In accordance with another aspect of the present disclosure, a method in an electronic device is disclosed, including: receiving, via a first communication module, an initial setting request message from an external electronic device through a first communication channel, receiving, via a second communication module security key information from the external electronic device through a second communication channel, and transmitting subscription information for communicating with a network provider to the external electronic device, wherein the first communication channel and the second communication channel have different communication characteristics.

DETAILED DESCRIPTION

Figure 1:
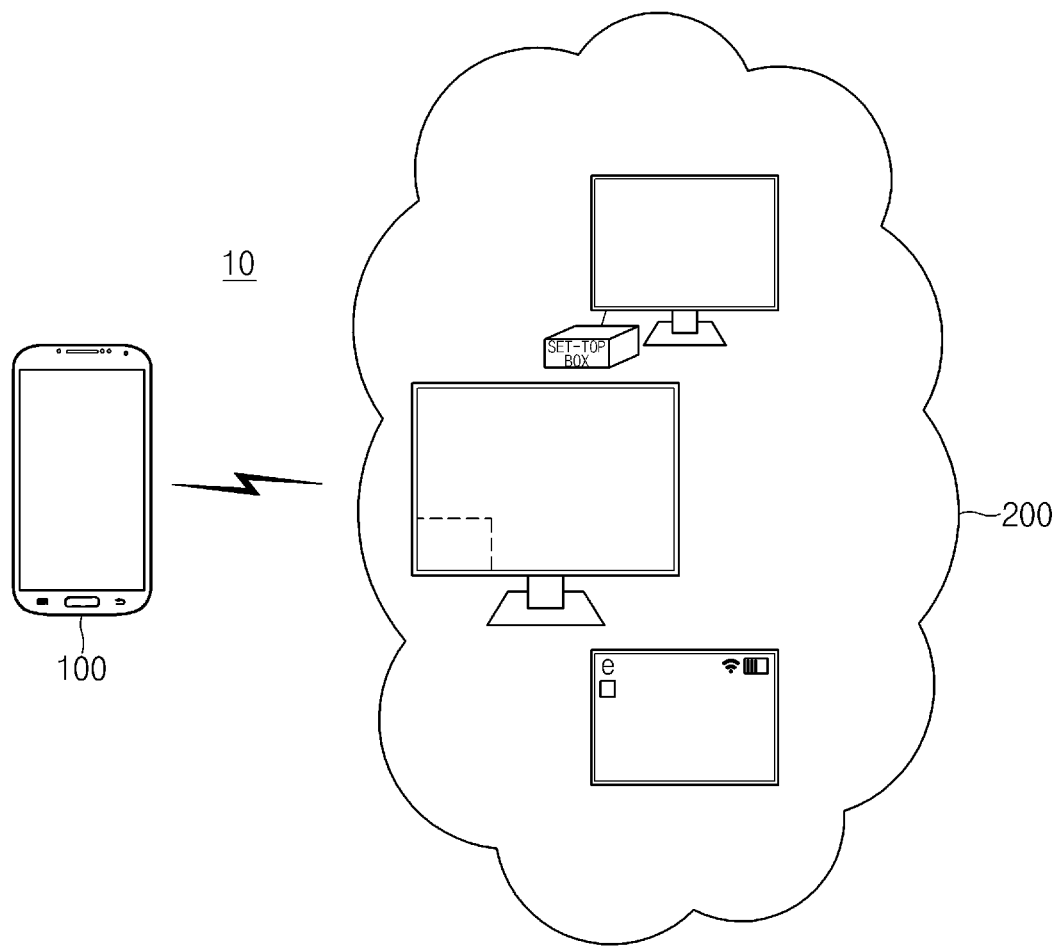
FIG. 1 is a view illustrating a registration supporting environment according to various embodiments of the present disclosure.

Hereinafter, various embodiments of the present disclosure are disclosed with reference to the accompanying drawings. However, it is understood that the various embodiments of the present disclosure are not limited to a specific embodiment and it should be understood that the present disclosure covers all the modifications, equivalents, and/or alternatives of this disclosure provided they come within the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a CPU or application processor) for performing corresponding operations by executing at least one software program stored in a memory device.

Terms used in various embodiments of the present disclosure are used to describe specific embodiments of the present disclosure, and are not intended to limit the other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a view illustrating a registration setting supporting environment according to various embodiments of the present disclosure.

Referring to FIG. 1, a registration setting supporting environment 10 may include a first electronic device 100 and a second electronic device 200. At least one of the first electronic device 100 and the second electronic device 200 may be a media device or a media apparatus. The media device or the media apparatus may include at least one of a display module and an audio module for outputting content or information. Alternatively, the media device or the media apparatus may transmit content or collected information to another electronic device (or a media device).

The registration setting supporting environment 10 supports the second electronic device 200 in a service unregistered state (for example, a specific account unregistered state or a network unregistered state) processing registration using the first electronic device 100 having service registration information (i.e., specific account registration information or network registration information).

The first electronic device 100, for example, may be a device having connection information with respect to a connection device (for example, an access point) supporting a corresponding network to allow communication with a specified network (for example, WiFi network). The connection information may include device identification information and device address information of the connection device. Additionally, the first electronic device 100 may be an electronic device having specified account information. Herein the specified account may include subscription information of a web server device (not shown) providing a device related service of the first electronic device 100. The web server device may store and manage device identification information relating to the first electronic device 100 and unique account information allocated to the first electronic device 100. In relation to the account information, as information for receiving a service provided by a web server device, at least one electronic device may be registered for each account represented by the account information. The account information may be determined during a registration process according to a user input or a policy of a web server device. The first electronic device 100, for example, may be a mobile electronic device (for example, a wearable electronic device, a smartphone, a note PC, a slate PC, a note pad, and so on). Alternatively, the first electronic device 100 may be an electronic device having network connection information obtained according to a connection history of connected to a specified network and having specified account information, regardless of a mobility of device. The first electronic device 100 may be an external electronic device with respect to the second electronic device 200.

The second electronic device 200 may be an electronic device designed to perform a specified function. The second electronic device 200, for example, may be an electronic device having no connection with a specified network. Alternatively, the second electronic device 200 may be an electronic device in which connection information for connecting to a specified network has been reset. Additionally, the second electronic device 200 may be an electronic device having no specified account registration. The second electronic device 200 may transmit a signal related to, associated with, or otherwise requesting initial setting (or initial setup) using a specified communication channel, and perform account and network registration processing using another electronic device (for example, the first electronic device 100) that is presently capable of receiving a corresponding signal from the desired network. The second electronic device 200, for example, may be a fixed type electronic device (for example, a TV monitor, a TV settop box, a projector, and various consumer electronic devices). Alternatively, the second electronic device 200 may be a mobile electronic device. The second electronic device 200 may be an external electronic device with respect to the first electronic device 100.

Figure 2:
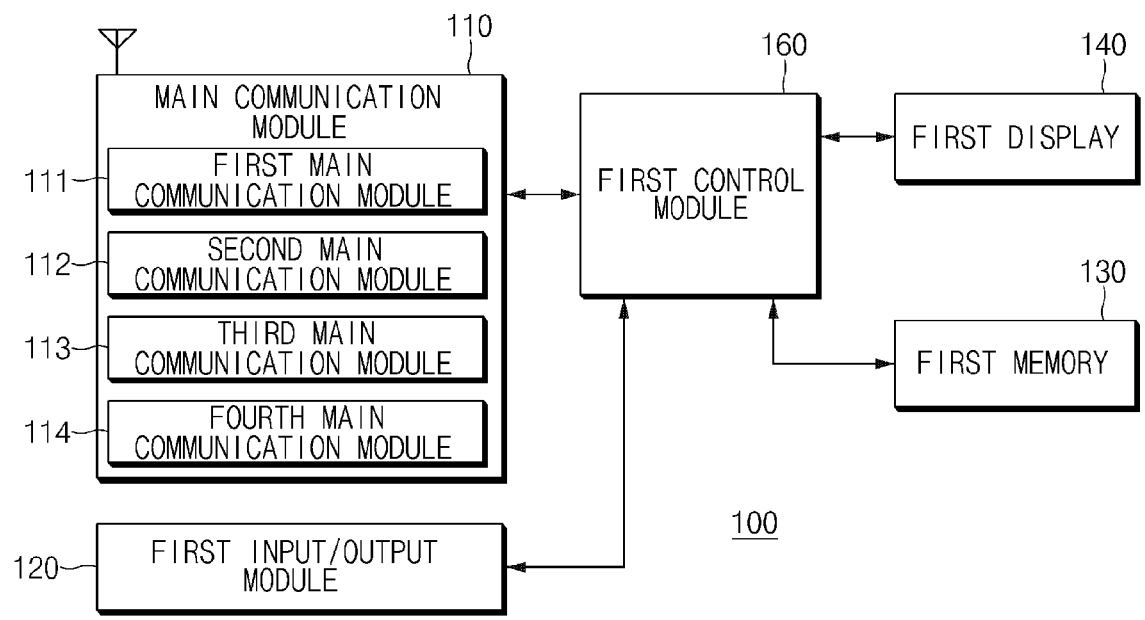
FIG. 2 is a view illustrating a first electronic device according to various embodiments of the present disclosure.

FIG. 2 is a view illustrating a first electronic device according to various embodiments of the present disclosure.

Referring to FIG. 2, a first electronic device 100 may include a main communication module 110, a first input/output module 120, a first memory 130, a first display 140, and a first control module 160 (or first processor).

The first electronic device 100 may receive a signal of the second electronic device 200 requesting an initial setting. When receiving an initial setting request, the first electronic device 100 may establish a specified communication channel with the second electronic device 200 and transmit subscription support information to the second electronic device 200 on the basis of a corresponding communication channel. When receiving subscription information from the second electronic device 200, the first electronic device 100 may perform processing to register the received subscription information. After processing the registration of the second electronic device 200, the first electronic device 100 may transmit registration information to the second electronic device 200. The registration information may include a message for indicating that a network connection registration or an account registration completion of the second electronic device 200. Alternatively, the registration information may include device identification information for registering the first electronic device 100 as a control device of the second electronic device 200.

The main communication module 110 may support a communication channel establishment of the first electronic device 100. The main communication module 110 may include a first main communication module 111, a second main communication module 112, a third main communication module 113, and a fourth main communication module 114. Additionally, the main communication module 110 may further include a network communication module (for example, a WiFi communication module) for accessing a specified communication network. Additionally, when the first electronic device 100 is a mobile terminal, the main communication module 110 may further include a mobile communication module for accessing a mobile network.

The first main communication module 111, for example, may be a Bluetooth Low Energy (BLE) communication module. The first main communication module 111 may enable a state within which the second electronic device 200 receives a signal using a multicast method or a broadcast method (for example, an "advertise" method). Relatedly, the first main communication module 111 may receive power according to a user input or pre-configured/preset schedule information and execute a waiting state anticipating reception of a signal transmitted from the second electronic device 200.

The second main communication module 112 may be a short range communication module implementing a different type of communication relative to the first main communication module 111. For example, the second main communication module 112 may communicate using a frequency of an audible band, an inaudible band or an ultra sound band. Alternatively, the second main communication module 112 may communicate using a frequency of a visible band. When the first main communication module 111 receives a specified signal from the second electronic device 200, the second main communication module 112 may be activated. The second main communication module 112 may receive a specified signal (for example, security key information for establishing a Bluetooth security channel) from the second electronic device 200, when in an activated/activation state. The second main communication module 112 may deliver the received signal (for example, security key information) to the first control module 160.

The third main communication module 113 may be a short range communication module implementing a different communication type relative to the second main communication module 112. For example, the third main communication module 113 may be a Bluetooth communication module. The third main communication module 113 may establish a short range security communication channel with the second electronic device 200 using security key information received by the second main communication module 112, in correspondence with control by the first control module 160. The third main communication module 113 may transmit subscription support information (for example, WiFi connection information or account information) to the second electronic device 200. Then, the third main communication module 113 may receive subscription information as response information for subscription support information from the second electronic device 200.

The fourth main communication module 114 may be a short range communication module implementing a different communication type relative to the third main communication module 113. For example, the fourth main communication module 114 may be an infrared communication module. The fourth main communication module 114 may transmit registration information corresponding to a control of the first control module 160 to the second electronic device 200. Additionally, the fourth main communication module 114 may transmit control information relating to a control of the second electronic device 200 to the second electronic device 200.

The first input/output module 120 may support an input function for processing a user input of the first electronic device 100. According to an embodiment of the present disclosure, the first input/output module 120 includes various forms of inputs such as a physical button, a key pad, a touch pad, and so on and may generate an input signal according to a user input. For example, the first input/output module 120 may generate an input signal for controlling power-on and power-off of an electronic device and an input signal relating to establishing a short range communication channel with the second electronic device 200. Alternatively, the first input/output module 120 may generate an input signal for activating the first main communication module 111, a check input signal for simple connection processing, and a control information input signal for control of the second electronic device 200 according to a user input.

The generated input signal may be delivered to the first control module 160 and used as an instruction for processing a related function.

According to various embodiments of the present disclosure, the first input/output module 120 may process at least one of an audio information processing function according to a function operation, and an information output function using indicators such as a light/lamp or execution of vibration. Relatedly, the first input/output module 120 may include a microphone for collecting ambient audio signals and a speaker for outputting audio generated according to a function operation. Additionally, the first input/output module 120 may include at least one of a light/lamp for outputting a light of one or more specified colors and light-based blinking in a specified pattern, and a vibration module for providing haptic vibration in a specified pattern according to execution or performance of some function. When the first electronic device 100 and the second electronic device 200 perform communication using an audible band frequency, the microphone may operate as a receiver of the second main communication module 112 and the speaker may operate as a transmitter of the second main communication module 112. According to various embodiments of the present disclosure, if the second main communication module 112 uses a visible band frequency, the lamp may be used as a transmitter for transmitting a visible band frequency. Accordingly, the second main communication module 112 may further include a receiving unit (e.g., a camera or some other optical sensor) for receiving a visible band frequency that the second electronic device 200 transmits by using the light/lamp.

The first memory 130 may store various programs and data relating to an operation of the first electronic device 100. For example, the first memory 130 may store operating system, middleware, Application Protocol Interface (API), and applications for operations of the first electronic device 100. According to an embodiment of the present disclosure, the first memory 130 may store an initial setting program relating to initial setting/configuration of the second electronic device 200. The initial setting program may include a routine (for example, at least one instruction, function, template, and class) for supporting the reception and processing of a request signal for requesting an initial setting using the first main communication module 111 and the second main communication module 112. Additionally, the initial setting program may include a routine for establishing a security channel with the second electronic device 200 using security information obtained during a request signal reception process, and a routine for performing transmission of subscription support information and reception of subscription information through a security channel, and further, performing registration processing of subscription information. Additionally, the initial setting program may further include a routine for outputting a control user-interface or "UI" for control of the second electronic device 200, and a routine for transmitting control information inputted/received through the control UI to the second electronic device 200.

The first memory 130 may store previously-registered service registration information in order to support an initial setting of the second electronic device 200. The service registration information, for example, may include connection information with respect to a specified network and specified account information. The first memory 130 may store subscription information received from the second electronic device 200 or registration information obtained based on subscription information.

The first display 140 may output at least one user interface according to a function operation of the first electronic device 100. For example, the first display 140 may output at least one of a standby screen, home screen, menu screen, and icon arrangement screen of the first electronic device 100. Additionally, the first display 140 may output a screen according to a communication connection with the second electronic device 200. For example, the first display 140 may output a screen corresponding to the reception of an initial setting request signal of the second electronic device 200 according to an operation of the first main communication module 111, a screen corresponding to a security key information reception according to an embodiment of the second main communication module 112, and a screen corresponding to a state of establishing a security channel with the second electronic device 200 according to an operation of the third main communication module 113. Additionally, the first display 140 may output a control UI for enabling control of the second electronic device 200.

The first control module 160 may process and deliver signals utilized for operations of the first electronic device 100 or to generate control signals. For example, the first control module 160 may activate the first main communication module 111 according to a user input or set information and check whether or not an initial setting request signal transmitted by the second electronic device 200 is received. When receiving the initial setting request signal, the first control module 160 may activate the second main communication module 112. According to an embodiment of the present disclosure, when the second main communication module 112 is included in a communication module that operates an audible band frequency (or an inaudible band frequency through which signals are received through a microphone), the first control module 160 may collect an audible frequency (or an inaudible band frequency) by activating a microphone. The first control module 160 may collect security key information relating to a security channel establishment with the second electronic device 200 using the main communication module 112. According to various embodiments of the present disclosure, the first control module 160 may simultaneously collect an initial setting request message and security key information by simultaneously operating the first main communication module 111 and the second main communication module 112 relating to an operation of an audible band frequency (or an inaudible band frequency).

When obtaining the initial setting request message and the security key information, the first control module 160 may perform a control to activate the third main communication module 113. The first control module 160 may establish a security channel with the second electronic device 200 on the basis of the third main communication module 113 using the collected security key information. The first control module 160 may transmit to the second electronic device 200 subscription support information including at least one of network connection information and account information stored in the first memory 130. When receiving subscription information from the second electronic device (for example, subscription information written by the second electronic device 200 on the basis of transmitted subscription support information), the first control module 160 may perform registration processing for the corresponding information.

According to an embodiment of the present disclosure, the first control module 160 may transmit WiFi network information to the second electronic device 200, and when receiving a connection request information for a WiFi network from the second electronic device 200, process an access point registration of the second electronic device 200 by delivering the received connection request information to a corresponding access point. The first control module 160 may operate at least one of the fourth main communication module 114 and the third main communication module 113 for transmitting, to the second electronic device 200, information for access point registration processing or registration information for control of the second electronic device 200.

According to an embodiment of the present disclosure, the first control module 160 may receive information utilized for account registration from the second electronic device 200 as subscription information (for example, device identification information) and register the received information in a web server device using the received information. The first control module 160 may perform a control to transmit, to the second electronic device 200, registration information for an account registration completion from a web server device. During this operation, the first control module 160 may use the fourth main communication module 114 for transmitting the registration information. For example, the first control module 160 may transmit registration information to the second electronic device 200 by using the fourth main communication module 114 implementing an infrared communication method. Alternatively, the first control module 160 may transmit registration information to the second electronic device 200 by using the third main communication module 113 implementing another communication method. The registration information may include device identification information (for example, information relating to message processing for controlling the second electronic device 200) of the first electronic device 100.

When receiving an initial setting request message and security key information from the second electronic device 200, the first control module 160 may output a pop-up window prompting confirmation to process a simple connection. When receiving a user input for executing a simple connection through a corresponding pop-up window, the first control module 160 may support activation and registration processing of the third main communication module 113. When receiving a user input not for performing a simple connection, the first control module 160 may cancel support for a simple connection. When receiving the same initial setting request message and security key information from the second electronic device 200 in which simple connection support is cancelled, the first control module 160 may limit/restrict display of a pop-up window output for simple connection processing. Alternatively, when the number of simple connection support cancellations is a greater than a specified number, the first control module 160 may limit/restrict display of a pop-up window. Relatedly, the first control module 160 may register, via a data history (or data log information) in the first memory 130, identification information and cancellation information of the second electronic device 200 for which simple connection support was cancelled.

Once service registration is completed, the first control module 160 may output a control UI for a control of the second electronic device 200. The control UI may be received from a web server device on the basis of device identification information of the second electronic device 200, or received from a server device relating to an information update of the first electronic device 100, or alternatively, mounted during a manufacturing process. Alternatively, in one embodiment, the control UI may be received from the second electronic device 200. When an input signal relating to an outputted control UI occurs, the first control module 160 may generate control information corresponding to a corresponding input signal. The first control module 160 may transmit the generated control information to the second electronic device 200. During this operation, the first control module 160 may transmit control information to the second electronic device 200 using at least one of the third main communication module 113 and the fourth main communication module 114.

Alternatively, although the first main communication module 111 is described in one example as implementing BLE communication and the second main communication module 112 is described in one example as implementing visible band communication, various embodiments of the present disclosure are not limited thereto. For example, the first main communication module 111 may implement short range communication available through another communication mode or module, such as NFC communication. Alternatively, the second main communication module 112 may be a communication module using a visible band frequency, an ultrasonic frequency, or an infrared frequency band. According to an embodiment of the present disclosure, the second main communication module 112, for example, may have communication characteristics different from the first main communication module 111. The communication characteristics may include at least one of a transmittable/receivable range or distance (or coverage), a frequency band (for example, 2.4 Ghz, 5 Ghz, 60 ghz, and so on), a transmittance (object transmittance characteristics of radio waves), a bandwidth (for example, a speed for delivering a specific security key in a more than a desired level), a packet size (for example, a communication protocol for transmitting a specific key in one packet such as that BLE is in 23 Bytes and sound communication is in 128 bits), a modulation method or algorithm, a channel scheduling management method, an encryption algorithm (for example, RSA, AES, and so on), and an encryption level within one or more encryption algorithms, strategies or protocols.

According to various embodiments of the present disclosure, the communication characteristics (for example, transmission range) may be different from the communication characteristics of the second main communication module 112. As mentioned above, various embodiments of the present disclosure may support the second electronic device 200 having a capacity to search for the first electronic device 1200 within a predetermined range, using main communication modules having different communication characteristics.

Additionally, various embodiments of the present disclosure may support to receive different information on the basis of the first main communication module 111 and the second main communication module 112 having different communication characteristics. For example, the first main communication module 111 may operate to receive an initial setting request message and the second main communication module 112 may operate to receive security key information.

Additionally, in the above-mentioned description, although the third main communication module 113 is described as an example of a Bluetooth communication module and the fourth main communication module 114 is described as an example of an infrared communication module, various embodiments of the present disclosure are not limited thereto. For example, the third main communication module 113 may be replaced with another communication module for establishing a security channel with the second electronic device 200, for example, a communication module for supporting a communication method such as NFC.

According to various embodiments of the present disclosure, the first control module 160 may perform a control to simultaneously activate the first main communication module 111, the second main communication module 112, the third main communication module 113, and the fourth main communication module 114. Accordingly, the first control module 160 may receive an initial setting request message and security key information substantially and simultaneously through the first main communication module 111 and the second main communication module 112. Additionally, the first control module 160 may establish a security channel with a sub electronic device by using the third main communication module 113 according to security key information reception.

As mentioned above, according to various embodiments of the present disclosure, an electronic device (for example, a first electronic device) may include a first communication module configured to receive an initial setting request message from an external electronic device through a first communication channel, a second communication module configured to receive security key information from the external electronic device through a second communication channel, a memory configured to store the initial setting request message and the security key information and a processor functionally connected with the first communication module, the second communication module and the memory, such that the processor configured to support a registration of the external electronic device transmitting the initial setting request message and the security key information.

As mentioned above, according to various embodiments of the present disclosure, an electronic device may include a first main communication module for receiving an initial setting request message through a first communication channel having first communication characteristics, a second main communication module for receiving security key information through a second communication channel having second communication characteristics, and a control module (for example, a first control module) for processing (or supporting) a registration of an external electronic device transmitting the initial setting request message and the security key information.

The control module (for example, a first control module) may support at least one of a network connection information setting of the external electronic device and an account registration setting of the external electronic device.

The first communication characteristics may be greater than the second communication characteristics.

The second main communication module may be a communication module for operating a frequency of at least one of an audible band, an inaudible band, and a visible band.

The control module may perform a control to activate the second main communication module from a deactivated state when receiving the initial setting request message.

When receiving the initial setting request message and the security key information, the control module may perform a control to output a pop-up window relating to a registration setting support guide and whether to support a registration setting of the external electronic device.

When receiving the security key information, the control module may perform a control to activate a third communication module for establishing a security communication channel based on the security key information.

The control module may perform a control to transmit subscription support information including at least one of connection information of a specified network to which the external electronic device is connected and account information registered by the external electronic device, through the security communication channel.

The control module may perform a control to output a control user interface for supporting a detail setting of the external electronic device.

The control module may perform a control to establish a communication channel different from the security communication channel, and transmit control information according to an operation of the control user interface to the external electronic device through the communication channel.

Figure 3:
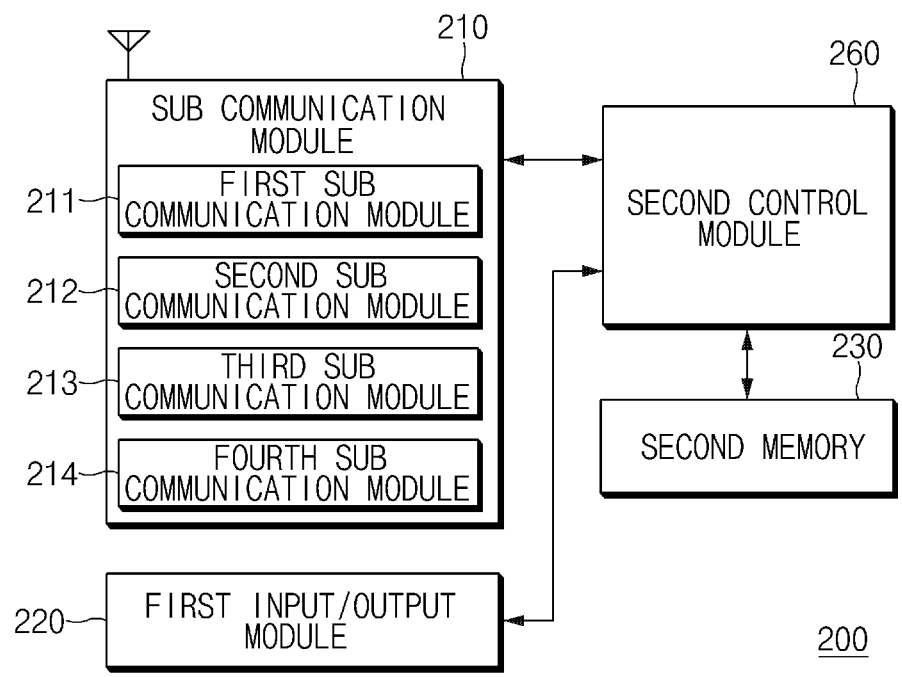
FIG. 3 is a view illustrating a second electronic device according to various embodiments of the present disclosure.

FIG. 3 is a view illustrating a second electronic device according to various embodiments of the present disclosure.

Referring to FIG. 3, according to various embodiments of the present disclosure, a second electronic device 200 may include a sub communication module 210, a "second" input/output module 220, a "second" memory 230, and a "second" control module 260 (or a "second" processor). Additionally, the second electronic device 200 may further include a "second" display. It is noted that the use of second does not necessarily indicate that these components must be in plurality, but rather is used herein to distinguish the components from those of the first electronic device 110 and its substantive components, as described in FIG. 2. It is further noted that nor does this preclude the inclusion of any of these components in plurality.

If there is no service registration information, the second electronic device 200 may output an initial setting request message and security key information for establishing a security channel. These may be output simultaneously or in different periods according to a user input or setting/configuration information. When the second electronic device 210 receives a communication channel establishment request based on the security key information from another external electronic device, which itself received the initial setting request message and the security key information (for example, the first electronic device 100), the second electronic device 200 may establish a security communication channel with the external electronic device. The second electronic device 200 may receive subscription support information through the established security communication channel and transmit subscription information through the same, where service registration related information is transmit to the first electronic device 100. The second electronic device 200 thus receives registration information from the first electronic device 100 and may complete service registration. Then, the second electronic device 200 may process data transmission/reception through network communication. Alternatively, the second electronic device 200 may register the first electronic device 100 as a control device on the basis of the received registration information, receive control information from the first electronic device 100, and perform function processing according thereto.

The sub communication module 210 may support an establishment of a communication channel for the second electronic device 200. The sub communication module 210, for example, may include a first sub communication module 211, a second sub communication module 212, a third sub communication module 213, and a fourth sub communication module 214.

The first sub communication module 211 may be a communication module for outputting an initial setting request message. For example, the first sub communication module 211 may output an initial setting request message through multicasting or broadcast output methods (or an advertisement output method). During this operation, the first sub communication module 211 may output the initial setting request message in a specified period. The first sub communication module 211 may be a communication module that is communicatively compatible with the first main communication module 111. For example, the first sub communication module 211 may be a BLE communication module. An initial setting request message may include state information and address information or device identification information. For example, in relation to the initial setting request message, as a BLE advertisement message, state information (for example, "State: OOBE") and address information (for example, "BT MAC" and "P2P MAC") may be included in content. In relation to the initial setting request message, the content may be changed according to a communication method.

The second sub communication module 212 may be a communication module that is communication-compatible with the second main communication module 112. For example, the second sub communication module 212 may utilize an audible band frequency. According to an embodiment of the present disclosure, the second sub communication module 212 may include a speaker for transmitting a message through a specified audible frequency. Alternatively, a speaker included in the second input/output module 220 may be temporarily used during operation of the second sub communication module 212. The second sub communication module 212, as mentioned above, may transmit security key information for establishing a secure communication channel. For example, the content of the security key information may include BLE MAC and BT Serial Port Protocol (SPP) PIN information. The content of the security key information may be changed according to a communication method change.

The third sub communication module 213 may provide communication with the third main communication module 113. For example, the third sub communication module 213 may be a Bluetooth communication module for establishing a security communication channel on the basis of the security key information. When receiving subscription support information, the third sub communication module 213 may deliver the received subscription support information to the second control module 260 and transmit subscription information to the first electronic device 100 in correspondence to a control of the second control module 260. When receiving a Bluetooth connection request through the second sub communication module 212, the third sub communication module 213 may be activated. When the third sub communication module 213 is activated, the first sub communication module 211 and the second sub communication module 212 may be deactivated.

The fourth sub communication module 214 may be a communication module that is available for transmitting/receiving information with the fourth main communication module 114. For example, the fourth sub communication module 214 may be a receiver module utilizing infrared communication. The fourth sub communication module 214, for example, may receive registration information and control information from the first electronic device 100. The received information may be delivered to the second control module 260.

The second input/output module 220 may perform the processing of user input or output of information for the second electronic device 200. According to an embodiment of the present disclosure, the second input/output module 220 may include a microphone for collecting audio signals and a speaker for outputting audio signals. In relation to the speaker of the second input/output module 220, according to various embodiments of the present disclosure, in order to output a sound effect according to a communication connection with the first electronic device 100 and signal transmission/reception or a guide sound corresponding to a progressing state guide, the second input/output module 220 may further include a lamp that flashes in correspondence to a communication connection with the first electronic device 100 or a registration progressing process and a vibration module that vibrates in correspondence to a registration progressing process. The speaker included in the second input/output module 220 may serve as a role of a transmitter of the second sub communication module 212.

The second memory 230 may store at least one program or data utilized for an operation of the second electronic device 200. For example, the second memory 230 may store subscription support information provided by the first electronic device 100. The second memory 230 may store registration information provided by the first electronic device 100. According to various embodiments of the present disclosure, the second memory 230 may store control UI related information. The control UI related information may be provided to the first electronic device 100 supporting simple connection. The control UI related information may include a controller relating to a detail setting of the second electronic device 200.

The second control module 260 may deliver and process signals utilized for operations of the second electronic device 200 or generate control signals. For example, the second control module 260 may activate the sub communication module 210 in correspondence to a user input and searches for the first electronic device 100 for initial setting. For example, the second control module 260 may perform a control to output an initial setting request message through the first sub communication module 211 and perform a control to output security key information through the second sub communication module 212. The second control module 260 may perform operations of the first sub communication module 211 and the second sub communication module 212 for a specified time and if there is no response from the first electronic device 100, may output a pop-up for recommending manual setting.

When receiving a message relating to security communication channel establishment from the first electronic device 100, the second control module 260 may establish a security communication channel with the first electronic device 100, receive subscription support information, transmit subscription information, and process the reception of control information. In relation to the reception of registration information and the reception processing of control information, the second control module 260 may perform a control to activate the fourth sub communication module 214. The second control module 260 may perform a control to provide control UI related information to the first electronic device 100 in relation to the reception processing of control information. Additionally, the second control module 260 may perform a control to output guide information relating to a control UI operation to the second display. For example, the second control module 260 may perform a control to output guide information (for example, information on a controller using method) relating to a detail setting of the second electronic device 200 after receiving the registration information.

According to various embodiments of the present disclosure, the second control module 260 may simultaneously activate the first sub communication module 211, the second sub communication module 212, the third sub communication module 213, and the fourth sub communication module 214. Then, the second control module 260 may transmit an initial setting request message by using the first sub communication module 211 and perform a control to transmit security key information at the same time or at a different time point substantially by using the second sub communication module 212. The second control module 260 may receive a communication channel establishment request (for example, a signal such as a pairing signal) from the main electronic device 100 by using the third sub communication module 213 and establish a communication channel in correspondence thereto. The second control module 260 may maintain a standby state for receiving control information from the main electronic device 100 by activating the fourth sub communication module 214.

As mentioned above, according to various embodiments of the present disclosure, an electronic device (for example, a second electronic device) may include a first sub communication module for transmitting an initial setting request message through a first communication channel having first communication characteristics, a second sub communication module for transmitting security key information through a second communication channel having second communication characteristics, and a control module (for example, a second control module) for establishing a security communication channel when an external electronic device requests security communication channel establishment on the basis of the security key information and performing device registration by using service registration information of the external electronic device.

The control module (for example, a second control module) may perform a control to substantially transmit the initial setting request message or the security key information simultaneously or in a predetermined period.

The control module may perform a control to deactivate the first sub communication module and the second sub communication module when establishing the security communication channel.

On the basis of at least one of specified network connection information of the external electronic device and account registration information of the external electronic device, the control module may perform a control to perform an access point registration of a specified network and the account registration.

The control module may perform a control to transmit control UI related information to the external electronic device through the security communication channel.

The control module may perform a control to process control information relating to a detail setting received through a communication channel different from the security communication channel.

Figure 4:
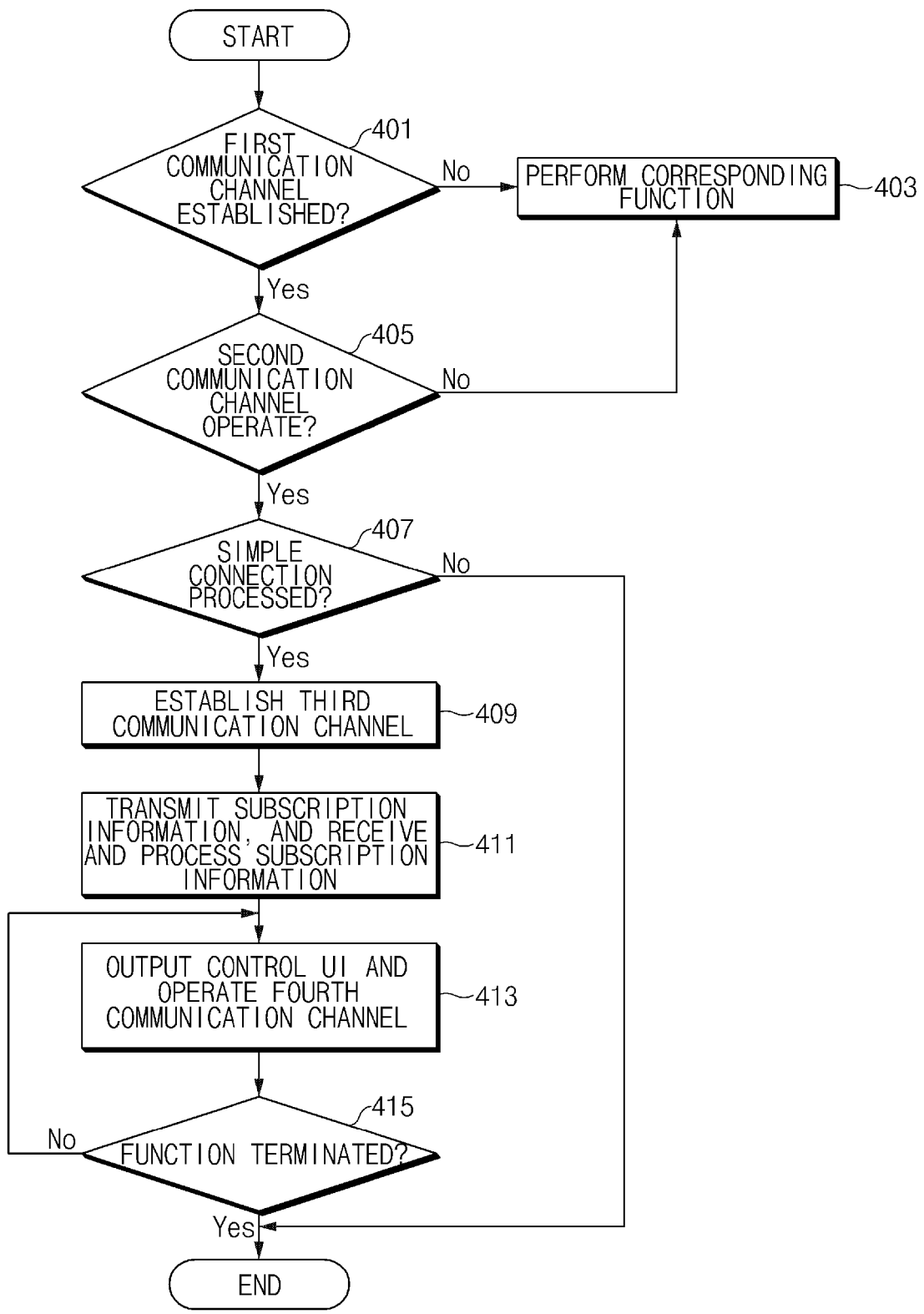
FIG. 4 is a flowchart illustrating a first electronic device operating method according to various embodiments of the present disclosure.

FIG. 4 is a flowchart illustrating a first electronic device operating method according to various embodiments of the present disclosure.

Referring to FIG. 4, according to various embodiments of the present disclosure, in relation to a first electronic device operating method, when an event occurs, in operation 401, the first control module 160 may check whether or not the event (for example, BLE advertise and scan) relates to an establishment of the first communication channel (or a first short range communication channel). Accordingly, the first electronic device 100 may maintain an available state for communication via the first main communication module 111. If the event does not relate to establishment of a first communication channel, in operation 403, the first control module 160 may perform a corresponding function according to a type of the event. For example, the first control module 160 may perform any desired user function (for example, a call function, a file playback function, and so on) supported by the first electronic device 100 according to the event type. If no additional event occurs, the first control module 160 may further execute or entire into a sleep state, or activate some other specified user function.

If the event relates to establishing a first communication channel, in operation 405, the first control module 160 may check whether an event relating to an operation of a second communication channel (or a second short range communication channel) is detected. Accordingly, the first control module 160 may activate the second main communication module 112. While the second main communication module 112 operates to communicate via an audible band frequency, the first control module 160 may activate a microphone. If no communication event is detected via operation of the second communication channel, the first control module 160 may perform some other specified function in operation 403, or another function in response to another user input or a prescheduled setting.

If operation of the second communication channel operation detects a subsequent event, then in operation 407, the first control module 160 may determine whether or not the event relates to processing for establishing a simple connection. Accordingly, after the first communication channel is established, the first control module 160 may determine whether or not a message is received by activating the second main communication module 112. The specified message may include security key information for establishment of a third communication channel (or a third short range communication channel).

When the specified message is received through the second communication channel, the first control module 160 may confirm the event for processing a simple connection, and request configuration information for simple connection processing. For example, the first control module 160 may display a pop-up window for simple connection processing. When an event is detected requesting simple connection processing (for example, selection of a confirmation button included in a pop-up window), the first control module 160 may establish a third communication channel with the second electronic device 200 in operation 409.

In operation 411, the first control module 160 may share registration information by performing transmission of subscription support information and reception/processing of subscription information. For example, the first control module 160 may perform a control to transmit, to the second electronic device 200, subscription support information including at least one of network connection information and account information. The first electronic device 100 may receive, from the second electronic device 200, subscription information including WiFi network connection related setup information and/or account registration related setup information. The first control module 160 may perform WiFi network registration processing or account registration processing on the basis of the received subscription information.

In operation 413, the first control module 160 may output a control UI and when a control UI related input signal is detected, operate a fourth communication channel (or a fourth short range communication channel) in relation to transmission of control information for a corresponding input signal. Relatedly, the first control module 160 may activate the fourth main communication module 114 relating to a fourth communication channel operation. The control UI related information may be pre-stored in the first memory 130, or may be received from the second electronic device 200. For example, the first electronic device 100 may receive control UI related information corresponding to transmitting registration information to the second electronic device 200. Alternatively, the first electronic device 100 may receive control UI related information from the second electronic device 200 during a third communication channel operation.

In operation 415, the first control module 160 may detect whether there is a request for function termination. If there is no function termination request, the method may proceed to operation 413 and reperform the operation. When a function termination related event is detected, the first control module 160 may process an initial setting related to function termination for the second electronic device 200. During this operation, the first control module 160 may perform a control to remove the control UI from the first display 140.

As mentioned above, according to various embodiments of the present disclosure, a registration setting supporting method relating to a first electronic device operation may include receiving an initial setting request message through a first communication channel having first communication characteristics, receiving security key information through a second communication channel having second communication characteristics, and processing (or supporting) a registration of an external electronic device transmitting the initial setting request message and the security key information.

The supporting of the registration may include at least one of processing a network connection information setting of the external electronic device; and processing an account registration setting of the external electronic device.

The method may further include activating the second main communication module from a deactivated state when receiving the initial setting request message.

The method may further include, when receiving the initial setting request message and the security key information, outputting a pop-up window relating to a registration setting support guide and whether to support a registration setting of the external electronic device.

The method may further include, when receiving the security key information, activating a third communication module for establishing a security communication channel based on the security key information.

The method may further include transmitting subscription support information including at least one of connection information of a specified network to which the external electronic device is connected and account information registered by the external electronic device, through the security communication channel.

The method may further include outputting a control user interface for supporting a detail setting of the external electronic device.

The method may further include establishing a communication channel different from the security communication channel and transmitting control information according to an operation of the control user interface to the external electronic device through the communication channel.

Figure 5:
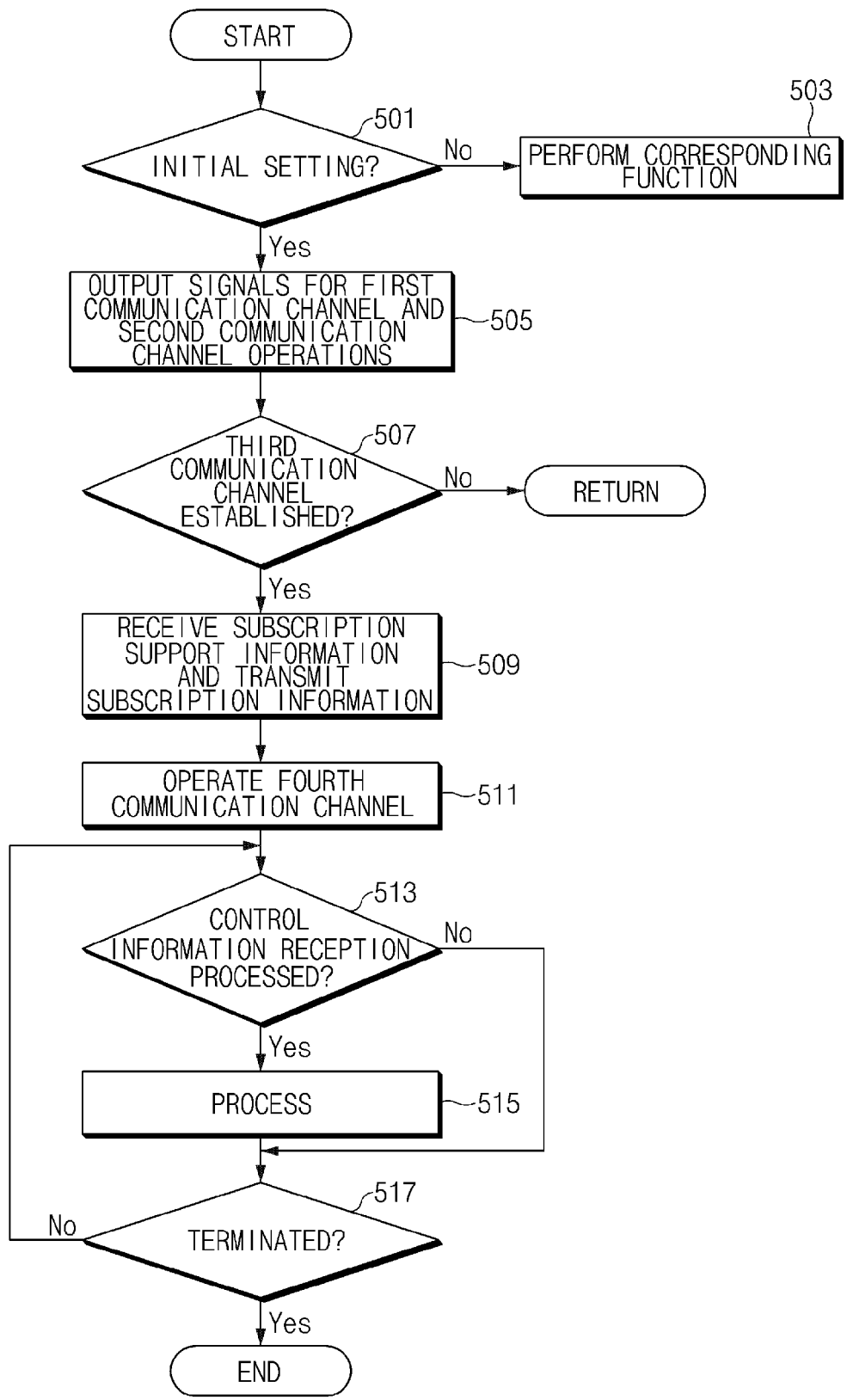
FIG. 5 is a flowchart illustrating a second electronic device operating method according to various embodiments of the present disclosure.

FIG. 5 is a flowchart illustrating a second electronic device operating method according to various embodiments of the present disclosure.

Referring to FIG. 5, according to various embodiments of the present disclosure, in relation to a second electronic device operating method, when an event occurs, in operation 501, the second control module 260 may detect whether the occurred event relates to an initial setting (e.g., registration/configuration for enabling operation of network connection). The second electronic device 200 may display a specified button for initial setting support, or a specified icon or menu item to a second display (e.g., a display of the second electronic device 210). Alternatively, after the second electronic device 210 is, for example, sold in the marketplace, and a first power-on is executed, the second control module 260 may be configured to treat the first power-on as an initial setting event. Alternatively, while performing an initialization process of the second electronic device 200, the second control module 260 may detect whether or not service registration information (for example, at least one of network connection information and account information) exists within the second electronic device 210, and if there is no service registration information, it may perform a control to execute the initial setting function automatically. Alternatively, the second control module 260 may indicate (via, for example, a notification or a displayed message) that there is no service registration information, and receive a user input in response requesting activation of the initial setting. Further, according to various embodiments of the present disclosure, when service registration information is deleted or reset, the second control module 260 may treat a corresponding deletion or reset event as an initial setting related event.

If an event relating to initial setting does not occur, the second control module 260 may process a function performance according to an event type in operation 503. For example, the second control module 260 may control a function performance such as power-on and power-off according to the event type. If an event related to initial setting occurs, in operation 505, the second control module 260 may perform a control to output a signal relating to operations of the first communication channel and the second communication channel. During this operation, the second control module 260 may perform a control to output an initial setting request message and security key information by using the first sub communication module 211 and the second sub communication module 212. According to an embodiment of the present disclosure, the second control module 260 may perform a control to output an initial setting request message by using the first sub communication module 211 and output security key information by using the second sub communication module 212.

In operation 507, the second control module 260 may detect whether an event relating to third communication channel establishment occurs. For example, the second control module 260 may detect whether an event relating to establishment of a third communication channel occurs through the second sub communication module 212. Alternatively, the second control module 260 may detect whether an event relating to third communication channel establishment is received by activating the third sub communication module 213. Relatedly, the first electronic device 100 may output (for example, activate the speaker of the first electronic device 100 and transmit a message by using an audible band frequency) a message for requesting third communication channel establishment through the second main communication module 112. Alternatively, when receiving security key information, the first electronic device 100 may activate the third main communication module 113 and may process signal transmission/reception for pairing.

When an event relating to third communication channel establishment occurs (for example, a pairing related message is received), in operation 509, the second control module 260 may establish a third communication channel with the first electronic device 100 and receive subscription support information (for example, at least one of specified network connection information and specified account information) from the first electronic device 100. When receiving subscription support information, the second control module 260 may perform a control to transmit subscription information to the first electronic device 100. For example, the second control module 260 may perform a control to transmit, to the first electronic device 100, subscription information including device identification information of the second electronic device 200 or network access related device information (for example, MAC address information of a WiFi communication module, a communication module identification information, and so on). Additionally, the second control module may transmit account registration request information including its device identification information to the first electronic device 100.

In operation 511, the second control module 260 may perform processing for a fourth communication channel operation. For example, after transmitting subscription information through a third communication channel, the second control module 260 may receive a response message according thereto (for example, a response message returned in correspondence to the subscription information reception completion of the first electronic device 100). When receiving a response message, the second control module 260 may deactivate the third sub communication module 213 and activate the fourth sub communication module 214. For example, the second control module 260 may perform a control to activate a reception device of an infrared communication module. When sub communication modules are designed to be activated simultaneously, operation 511 may be omitted.

In operation 513, the second control module 260 may detect whether an event relating to control information reception processing occurs. For example, the second control module 260 may detect whether control information is received from the first electronic device 100. When the control information is received, the second control module 260 may perform processing of corresponding control information in operation 515. For example, the second control module 260 may process a configuration setting relating to service registration on the basis of the control information transmitted by the first electronic device 100. If there is no control information reception, the second control module 260 may skip operation 515.

In operation 517, the second control module 260 may check whether function termination is detected. If there is no function termination related event, the second control module 260 may return to operation 513 and reperform subsequent operations. Alternatively, the second control module 260 may process a function control corresponding to an input signal by the second input/output device.

As mentioned above, a registration setting supporting method relating to the second electronic device operation may include transmitting an initial setting request message through a first communication channel having first communication characteristics and security key information through a second communication channel having second communication characteristics (for example, at least one of a reaching distance (or coverage), a transmittance, a frequency band, a bandwidth, a packet size, a modulation method or algorithm, a channel scheduling management method, an encryption algorithm, and an encryption level is different from the first communication channel), establishing a security communication channel according to a security communication channel establishment request reception from an external electronic device on the basis of the security key information, and performing device registration by using service registration information of the external electronic device received through the security communication channel.

The transmitting of the initial setting request message may include substantially transmitting the initial setting request message or the security key information simultaneously or in a predetermined period.

The method may further include deactivating the first sub communication module and the second sub communication module during the establishing of the security communication channel.

The performing of the device registration may include performing an access point registration of a specified network and the account registration on the basis of at least one of specified network connection information of the external electronic device and account registration information of the external electronic device.

The method may further include transmitting control UI related information to the external electronic device through the security communication channel.

The method may further include processing control information relating to a detail setting received through a communication channel different from the security communication channel.

Figure 6:
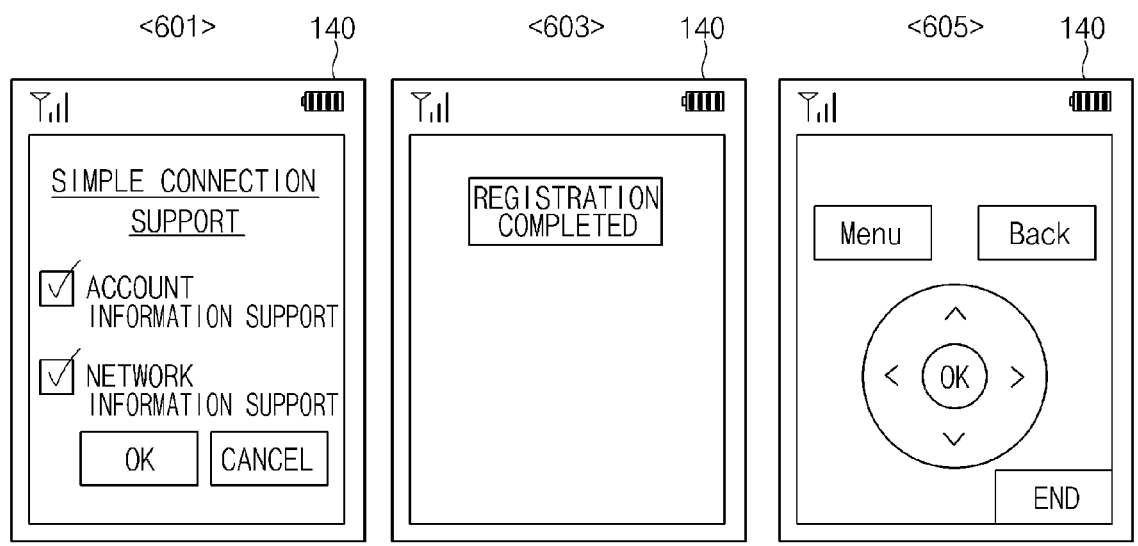
FIG. 6 is a view illustrating a screen interface of a first electronic device according to various embodiments of the present disclosure.

FIG. 6 is a view illustrating a screen interface of a first electronic device according to various embodiments of the present disclosure.

Referring to FIG. 6, the first electronic device 100 may activate the first main communication module 111. For example, the first electronic device 100 may maintain the first main communication module 111 in a standby state for receiving a BLE message. When receiving an initial setting request message from the second electronic device 200, the first electronic device 100 may enable reception of security key information by activating the second main communication module 112. When receiving the initial setting request message and the security key information, the first electronic device 100 may then determine that a simple connection request has been received from the second electronic device 200. In this case, the first display 140 of the first electronic device 100 may display a pop-up window relating to simple connection support, as shown in a screen 601. The pop-up window, for example, may include information for guiding simple connection support and simple connection items (for example, account information support or network information support) that are requested by the second electronic device 200, or supported by the first electronic device 100. Additionally, the pop-up window may include a displays, buttons, icons, etc. allowing a user to confirm, execute (for example, an "ok" button) or cancel (for example, a "cancel" button) simple connection support.

When an event for performing simple connection support (for example, detecting selection of the "ok" button) occurs, the first electronic device 100 may establish a security communication channel with the second electronic device 200. The first electronic device 100 may transmit subscription support information through the established communication channel and receive subscription information from the second electronic device 200 in correspondence thereto, and perform a registration process according to subscription information processing. Once the service registration of the second electronic device 200 is completed, as shown in a screen 603, the first display 140 may output guide information corresponding to the service registration completion of the second electronic device 200.

Additionally, the first electronic device 100 may output a control UI relating to a detail setting or configuration setting of the second electronic device 200 as shown in a screen 605. The control UI may be designed in relation to a control of the second electronic device 200. The control UI, for example, may include at least one of a virtual control button, a menu button, and a back button, which relate to a control of the second electronic device 200. Additionally, the control UI may include a virtual end button for canceling or terminating the output of a corresponding UI. A user may thus enter control inputs, which are transmitted as control information to the second electronic device 200, simply by touching the first display 140 where the control UI is displayed.

Figure 7:
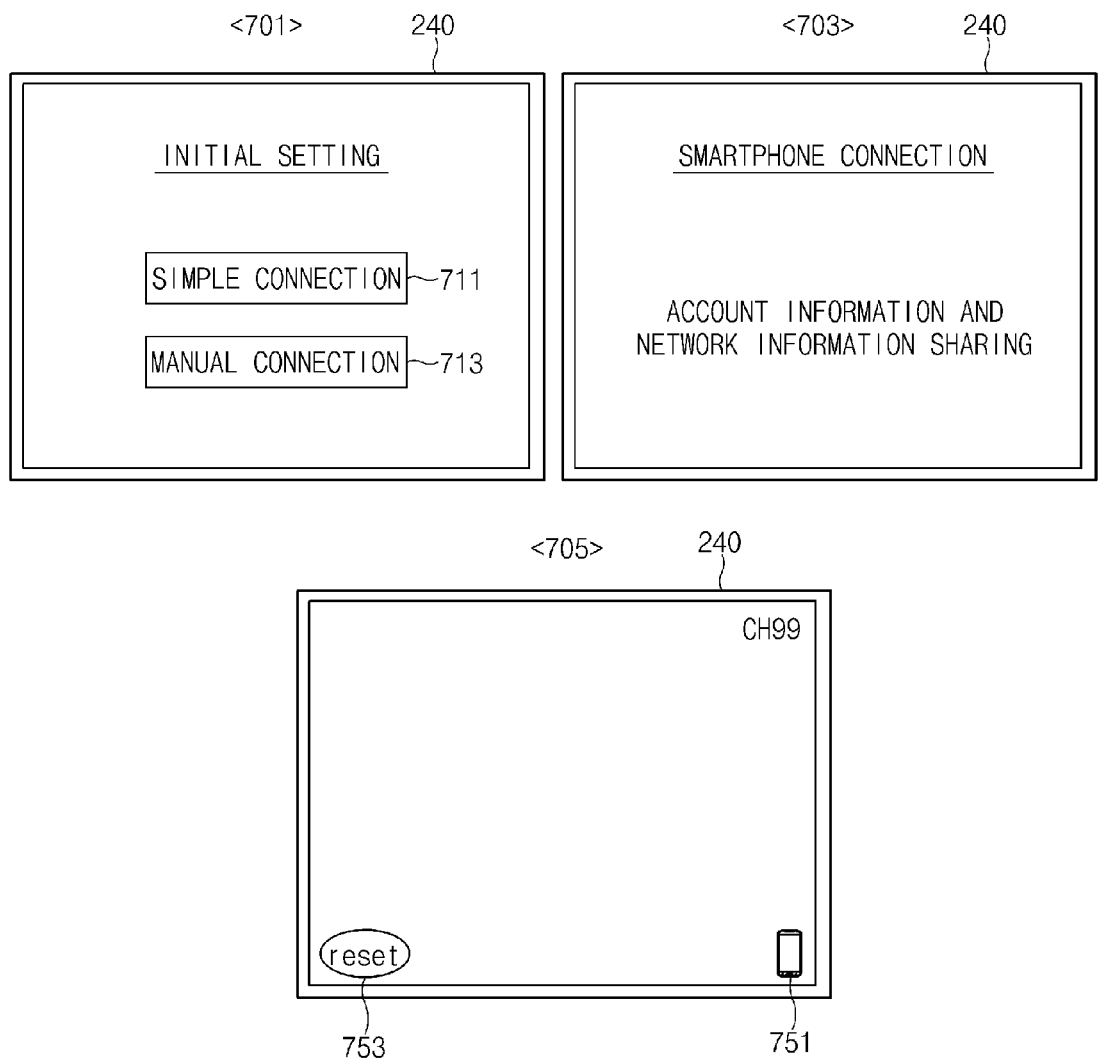
FIG. 7 is a view illustrating a screen interface of a second electronic device according to various embodiments of the present disclosure.

FIG. 7 is a view illustrating a screen interface of a second electronic device according to various embodiments of the present disclosure. In the description below, information output is described under the assumption that the second electronic device 200 includes the second display 240 or is communicatively connected to the second display 240.

Referring to FIG. 7, as shown in a screen 701, the second electronic device 200 may output an initial setting screen to the second display 240 according to an initial power-on event, a determination that there is no service registration information during an initialization process, or when service registration information is determined to have been deleted or reset. The initial setting screen, for example, may include a simple connection item 711 and a manual connection item 713. The simple connection item 711 may be an item selectable to cause executing of service registration by sharing service registration information of the first electronic device 100. The manual connection item 713 may be an item selectable to cause processing of network connection information settings or account information registration using the second input/output module 220 included in the second electronic device 200.

When the simple connection item 711 is selected, the second electronic device 200 may transmit an initial setting request message and security key information using the first sub communication module 211 and the second sub communication module 212. The second electronic device 200 may receive a message requesting security communication channel establishment from the first electronic device 100 receiving corresponding information. In this case, the second electronic device 200 may establish a security communication channel with the first electronic device 100, and in correspondence thereto, as shown in a screen 703, may output connection state information of the first electronic device 100 to the second display 240.

When service registration is completed using the first electronic device 100, the second electronic device 200 may output to the second display 240 a screen 705 relating to detail information setting or a function execution screen via a control of the first electronic device 100. For example, the screen 705 of the second display 240 may include a control state icon 751 representing a detail setting or configuration for using the first electronic device 100, or a connection state of the first electronic device 100, and further, a reset icon 753 selectable to reset an initial setting. Additionally, the screen 705 of the second display 240 may allocate a specific reception frequency to a specific channel number, according to a control of the first electronic device 100.

Figure 8:
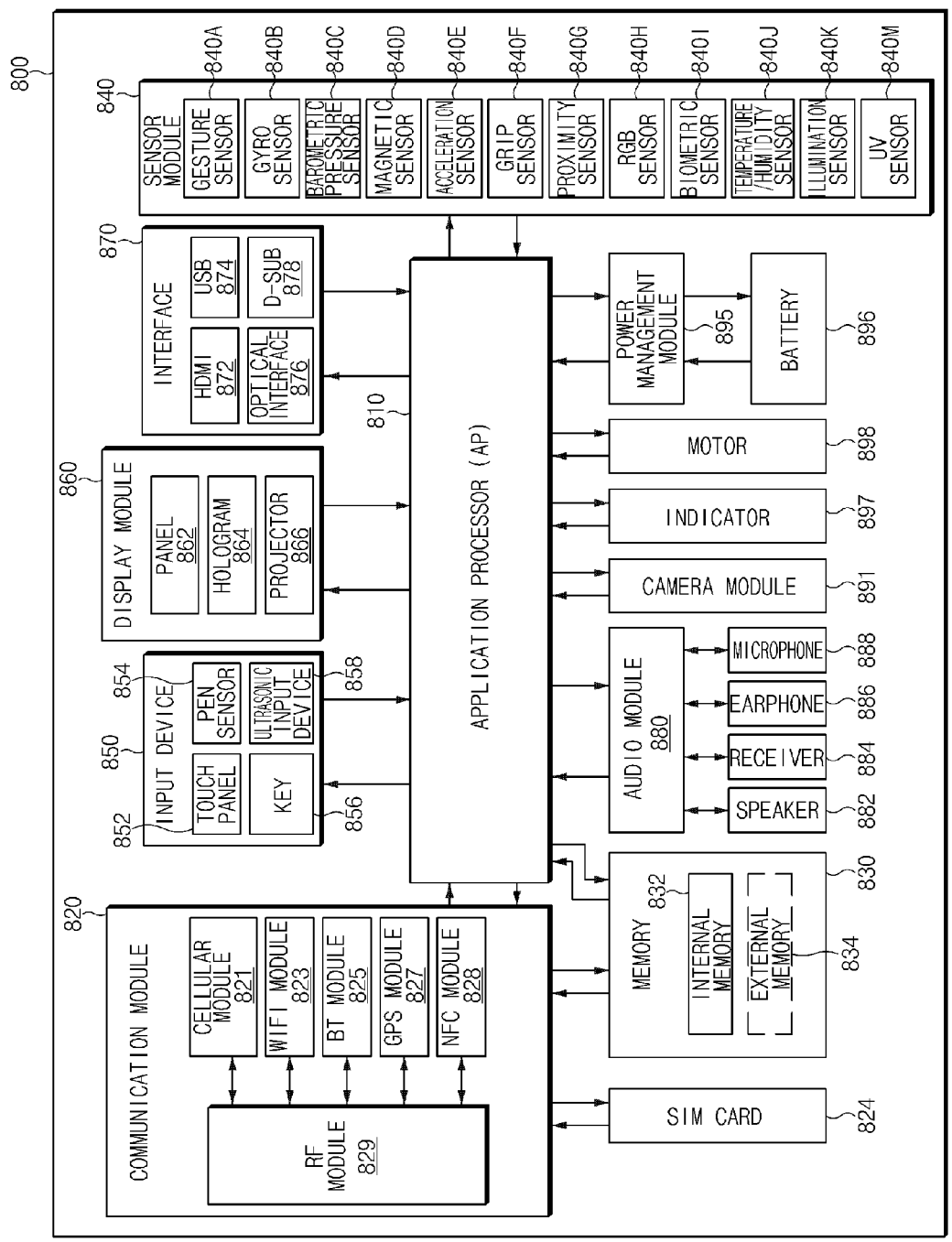
FIG. 8 is a block diagram of an electronic device according to various embodiments of the present disclosure.

FIG. 8 is a block diagram of an electronic device according to various embodiments of the present disclosure.

Referring to FIG. 8, an electronic device 800, for example, may include all or part of the above-mentioned electronic device 100 or 200 shown in FIG. 1. The electronic device 800 may include at least one processor (for example, an application processor (AP) 810), a communication module 820, a subscriber identification module (SIM) 824, a memory 830, a sensor module 840, an input device 850, a display 860, an interface 870, an audio module 880, a camera module 891, a power management module 895, a battery 896, an indicator 897, and a motor 898.

The processor 810 may control a plurality of hardware or software components connected thereto and also may perform various data processing and operations by executing an operating system or an application program. The processor 810 may be implemented with a system on chip (SoC), for example. According to an embodiment of the present disclosure, the processor 810 may further include a graphic processing unit (GPU) (not shown) and/or an image signal processor. The processor 810 may include at least part (for example, the cellular module 821) of components shown in FIG. 8. The processor 810 may load commands or data received from at least one of other components (for example, nonvolatile memory) and process them and may store various data in a nonvolatile memory.

The communication module 820 may have the same or similar configuration to the communication modules (for example, the main and sub communication modules 110 and 210). The communication module 820 may include a cellular module 821, a WiFi module 823, a BT module 825, a GPS module 827, an NFC module 828, and a radio frequency (RF) module 829.

The cellular module 821, for example, may provide voice call, video call, text service, or internet service through communication network. According to an embodiment of the present disclosure, the cellular module 821 may perform a distinction and authentication operation on the electronic device 800 in a communication network by using a SIM (for example, a SIM card) 824. According to an embodiment of the present disclosure, the cellular module 821 may perform at least part of a function that the processor 810 provides. According to an embodiment of the present disclosure, the cellular module 821 may further include a communication processor (CP).

Each of the WiFi module 823, the BT module 825, the GPS module 827, and the NFC module 828 may include a processor for processing data transmitted/received through a corresponding module. According to an embodiment of the present disclosure, at least part (for example, at least one) of the cellular module 821, the WiFi module 823, the BT module 825, the GPS module 827, and the NFC module 828 may be included in one integrated chip (IC) or IC package.

The RF module 829, for example, may transmit/receive communication signals (for example, RF signals). The RF module 829, for example, may include a transceiver, a power amp module (PAM), a frequency filter, a low noise amplifier (LNA), or an antenna. According to another embodiment of the present disclosure, at least one of the cellular module 821, the WiFi module 823, the Bluetooth module 825, the GPS module 827, and the NFC module 828 may transmit/receive RF signals through a separate RF module.

The SIM 824, for example, may include a card including a SIM and/or an embedded SIM and also may include unique identification information (for example, an integrated circuit card identifier (ICCID)) or subscriber information (for example, an international mobile subscriber identity (IMSI)).

The memory 830, for example, may include an internal memory 832 or an external memory 834. The internal memory 832 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory or NOR flash memory), hard drive, or solid state drive (SSD)).

The external memory 834 may further include flash drive, for example, compact flash (CF), secure digital (SD), micro Micro-SD, Mini-SD, extreme digital (xD), (MultiMediaCard (MMC), or a memorystick. The external memory 834 may be functionally and/or physically connected to the electronic device 800 through various interfaces.

The sensor module 840 measures physical quantities or detects an operating state of the electronic device 800, thereby converting the measured or detected information into electrical signals. The sensor module 840 may include at least one of a gesture sensor 840A, a gyro sensor 840B, a barometric pressure sensor 840C, a magnetic sensor 840D, an acceleration sensor 840E, a grip sensor 840F, a proximity sensor 840G a color sensor 840H (for example, a red, green, blue (RGB) sensor), a biometric sensor 840I, a temperature/humidity sensor 840J, an illumination sensor 840K, and an ultra violet (UV) sensor 840M. Additionally or alternatively, the sensor module 840 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 840 may further include a control circuit for controlling at least one sensor therein. According to an embodiment of the present disclosure, the electronic device 800 may further include a processor configured to control the sensor module 840 as part of or separately from the processor 810 and thus may control the sensor module 840 while the processor 810 is in a sleep state.

The input device 850 may include a touch panel 852, a (digital) pen sensor 854, a key 856, or an ultrasonic input device 858. The touch panel 852 may use at least one of capacitive, resistive, infrared, or ultrasonic methods, for example. Additionally, the touch panel 852 may further include a control circuit. The touch panel 852 may further include a tactile layer to provide tactile response to a user.

The (digital) pen sensor 854, for example, may include a sheet for recognition as part of a touch panel or a separate sheet for recognition. The key 856 may include a physical button, an optical key, or a keypad, for example. The ultrasonic input device 858 may detect ultrasonic waves generated from an input tool through a microphone (for example, the microphone 888) in order to check data corresponding to the detected ultrasonic waves.

The display 860 may include a panel 862, a hologram device 864, or a projector 866. The panel 862 may have the same or similar configuration to the first or second display 140 or 240. The panel 862 may be implemented to be flexible, transparent, or wearable, for example. The panel 862 and the touch panel 852 may be configured with one module. The hologram 864 may show three-dimensional images in the air by using the interference of light. The projector 866 may display an image by projecting light on a screen. The screen, for example, may be placed inside or outside the electronic device 800. According to an embodiment of the present disclosure, the display 860 may further include a control circuit for controlling the panel 862, the hologram device 864, or the projector 866.

The interface 870 may include a high-definition multimedia interface (HDMI) 872, a universal serial bus (USB) 874, an optical interface 876, or a D-subminiature (sub) 878, for example. Additionally or alternatively, the interface 870 may include a mobile high-definition link (MHL) interface, a secure Digital (SD) card/multi-media card (MMC) interface, or an infrared data association (IrDA) standard interface.

The audio module 880 may convert sound into electrical signals and convert electrical signals into sounds. At least some components of the audio module 880 may process sound information inputted/outputted through a speaker 882, a receiver 884, an earphone 886, or a microphone 888.

The camera module 891, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 895 may manage the power of the electronic device 800. According to an embodiment of the present disclosure, the power management module 895 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 896, or a voltage, current, or temperature thereof during charging. The battery 896, for example, may include a rechargeable battery and/or a solar battery.

The indicator 897 may display a specific state of the electronic device 800 or part thereof (for example, the processor 810), for example, a booting state, a message state, or a charging state. The motor 898 may convert electrical signals into mechanical vibration and may generate vibration or haptic effect. Although not shown in the drawings, the electronic device 800 may include a processing device (for example, a GPU) for mobile TV support. A processing device for mobile TV support may process media data according to the standards such as digital multimedia broadcasting (DMB), digital video broadcasting (DVB), or mediaFLO™.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 9:
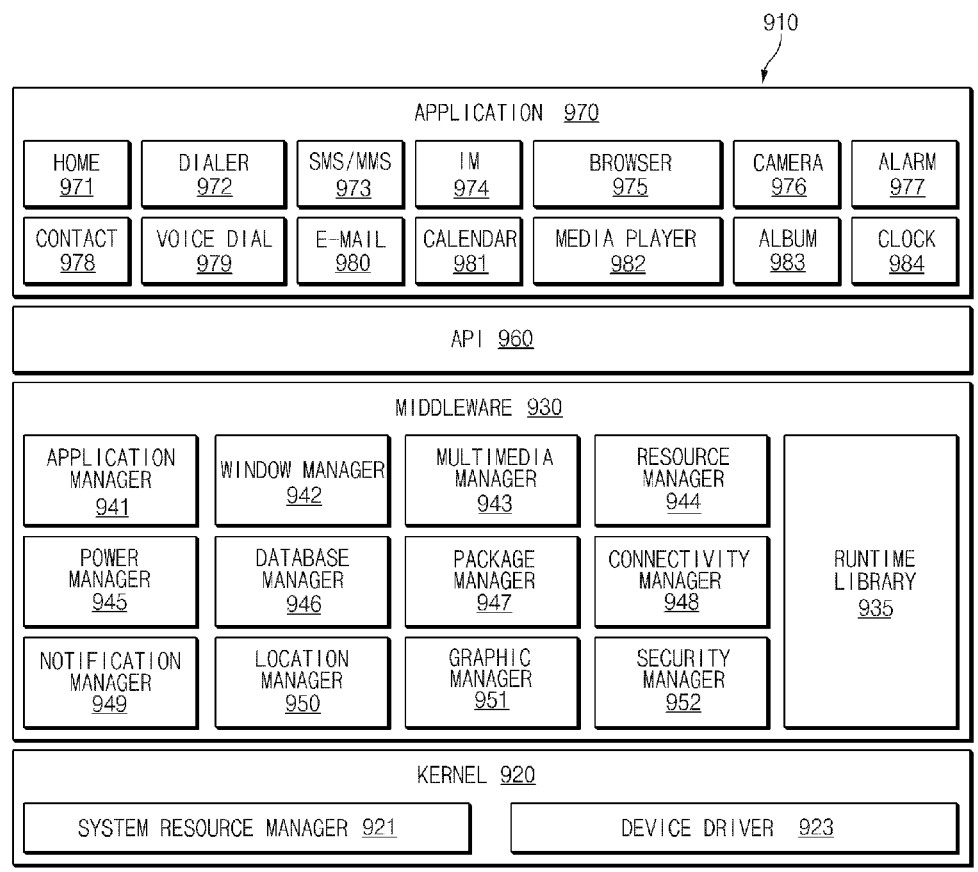
FIG. 9 is a block diagram of a program module according to various embodiments of the present disclosure.

FIG. 9 is a block diagram of a program module according to various embodiments of the present disclosure.

Referring to FIG. 9, according to an embodiment of the present disclosure, the program module 910 may include an operating system (OS) for controlling a resource relating to an electronic device (for example, at least one of the electronic devices 800, 100, and 200) and/or various applications (or programs) running on the OS. The OS, for example, may include android, iOS, windows, symbian, tizen, or bada. The program module 910 may be stored in the memory of the above-mentioned first electronic device and second electronic device and may be provided.

The program module 910 may include a kernel 920, a middleware 930, an API 960, and/or an application 970. At least part of the program module 910 may be preloaded on an electronic device or may be downloaded from a server (for example, the electronic devices 100 and 200).

The kernel 920, for example, may include a system resource manager 921 or a device driver 923. The system resource manager 921 may perform the control, allocation, or retrieval of a system resource. According to an embodiment of the disclosure, the system resource manager 921 may include a process management unit, a memory management unit, or a file system management unit. The device driver 923, for example, may include a display driver, a camera driver, a Bluetooth driver, a sharing memory driver, a USB driver, a keypad driver, a WiFi driver, an audio driver, or an inter-process communication (IPC) driver.

The middleware 930, for example, may provide a function that the application 970 utilizes commonly, or may provide various functions to the application 970 through the API 960 in order to allow the application 970 to efficiently use a limited system resource inside the electronic device. According to an embodiment of the disclosure, the middleware 930 (for example, the middleware 143) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935, for example, may include a library module that a compiler uses to add a new function through a programming language while the application 970 is running. The runtime library 935 may perform a function on input/output management, memory management, or an arithmetic function.

The application manager 941, for example, may mange the life cycle of at least one application among the applications 970. The window manager 942 may manage a GUI resource used in a screen. The multimedia manager 943 may recognize a format for playing various media files and may encode or decode a media file by using the codec corresponding to a corresponding format. The resource manager 944 may manage a resource such as a source code, a memory, or a storage space of at least any one of the applications 970.

The power manager 945, for example, may operate together with a basic input/output system (BIOS) to manage the battery or power and may provide power information utilized for an operation of the electronic device. The database manager 946 may create, search, or modify a database used in at least one application among the applications 970. The package manager 947 may manage the installation or update of an application distributed in a package file format.

The connectivity manger 948 may manage a wireless connection such as WiFi or Bluetooth. The notification manager 949 may display or notify an event such as arrival messages, appointments, and proximity alerts to a user in a manner of not interrupting the user. The location manager 950 may manage location information on an electronic device. The graphic manager 951 may manage a graphic effect to be provided to a user or a user interface relating thereto. The security manager 952 may provide various security functions utilized for system security or user authentication. According to an embodiment, when an electronic device (for example, the electronic device 100) includes a phone function, the middleware 930 may further include a telephony manager for managing a voice or video call function of the electronic device.

The middleware 930 may include a middleware module for forming a combination of various functions of the above-mentioned components. The middleware 930 may provide a module specialized for each type of OS to provide differentiated functions. Additionally, the middleware 930 may delete part of existing components or add new components dynamically.

The API 960, for example, as a set of API programming functions, may be provided as another configuration according to OS. For example, in the case of android or iOS, one API set may be provided for each platform and in the case Tizen, at least two API sets may be provided for each platform.

The application 970, for example, may include at least one application for providing functions such as a home 971, a dialer 972, an SMS/MMS 973, an instant message 974, a browser 975, a camera 976, an alarm 977, a contact 978, a voice dial 979, an e-mail 980, a calendar 981, a media player 982, an album 983, a clock 984, health care (for example, measure an exercise amount or blood sugar), or environmental information provision (for example, provide air pressure, humidity, or temperature information).

According to an embodiment, the application 970 may include an application (hereinafter referred to as "information exchange application") for supporting information exchange between an electronic device and an external electronic device. The information exchange application, for example, may include a notification relay application for relaying specific information to the external device or a device management application for managing the external electronic device.

For example, the notification relay application may have a function for relaying, to an external electronic device, notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of an external electronic device communicating with the electronic device, an application operating in the external electronic device, or a service (for example, call service or message service) provided from the external device.

According to an embodiment of the disclosure, the application 970 may include a specified application (for example, a health care application of a mobile medical device) according to the property of an external electronic device. According to an embodiment, the application 970 may include an application received from an external electronic device. According to an embodiment of the disclosure, the application 970 may include a preloaded application or a third party application downloadable from a server. The names of components in the program module 910 according to the shown embodiment may vary depending on the type of OS.

According to various embodiments of the present disclosure, service registration of an unregistered electronic device may be processed simply and easily.

According to various embodiments of the present disclosure, at least part of the program module 910 may be implemented with software, firmware, hardware, or a combination thereof. At least part of the programming module 910, for example, may be implemented (for example, executed) by a processor. At least part of the programming module 910 may include a module, a program, a routine, sets of instructions, or a process to perform at least one function, for example.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. The instruction may be set to perform establishing a communication channel with an external electronic device on the basis wired communication or short range communication, obtaining a communication profile utilized for a sub communication module operation for supporting base station based communication service by using the connected external electronic device, and storing the obtained communication profile.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

What is claimed is:

1. An electronic device comprising:
a first communication module;
a second communication module;
a memory; and
at least one processor operatively coupled to the memory, configured to:
control the first communication module to receive an initial setting request message for registering an external electronic device from the external electronic device through a first communication channel,
control the second communication module to receive security key information for registering the external electronic device from the external electronic device through a second communication channel,
store the initial setting request message and the security key information in the memory, and
transmit subscription information for communicating with a network provider to the external electronic device,
wherein the at least one processor is further configured to: transmit subscription support information including at least one of network connection information and account information for communicating with the network provider to the external electronic device,
wherein the least one processor is further configured to: in response to receiving the security key information, activate a third communication module to establish a security communication channel based on the security key information, and
wherein the at least one processor is further configured to: control to output a user control interface for supporting a detail setting of the external electronic device, and
wherein the at least one processor is further configured to: control to establish a separate communication channel different from the security communication channel via operation of a fourth communication module, and transmit control information received via operation of the user control interface to the external electronic device through the separate communication channel.

2. The electronic device of claim 1, wherein the first communication channel differs from the second communication channel in at least one of transmission range, transmittance, frequency band, bandwidth, packet size, modulation algorithm, a channel scheduling management algorithm, an encryption algorithm, and an encryption level within the encryption algorithm.

3. The electronic device of claim 1, wherein the second communication module supports communication an audible frequency band, an inaudible frequency band, and a visible frequency band.

4. The electronic device of claim 1, wherein when receiving the initial setting request message, the at least one processor activates the second communication module from a deactivated state.

5. The electronic device of claim 1, wherein the at least one processor is further configured to:
in response to receiving the initial setting request message and the security key information, control a display to display a pop-up window including a registration setting support user-interface, and a selectable confirmation to execute registration for the external electronic device.

6. The electronic device of claim 1, wherein the at least one processor is further configured to:
control to transmit, via the security communication channel, subscription support information including at least one of connection information for the network provider to which the external electronic device is connected and account information for the external electronic device.

7. A method in an electronic device, comprising:
receiving, via a first communication module, an initial setting request message for registering an external electronic device from the external electronic device through a first communication channel;
receiving, via a second communication module security key information for registering the external electronic device from the external electronic device through a second communication channel; and transmitting subscription information for communicating with a network provider to the external electronic device, in response to receiving the security key information, activating a third communication module to establish a security communication channel based on the security key information, controlling a display to output a user control interface for supporting a detail setting of the external electronic device, activating a fourth communication module in response to an input received via the user control interface to establish a separate communication channel different from the security communication channel; and transmitting control information received via operation of the user control interface to the external electronic device through the separate communication channel based on the fourth communication module, wherein the first communication channel and the second communication channel have different communication characteristics, and wherein transmitting the subscription information further comprises at least one of:

transmitting the subscription support information including at least one of network connection information and account information for communicating with the network provider to the external electronic device.

8. The method of claim 7, wherein the first communication channel differs from the second communication channel in at least one of transmission range, transmittance, frequency band, bandwidth, packet size, modulation algorithm, a channel scheduling management algorithm, an encryption algorithm, and an encryption level within the encryption algorithm.

9. The method of claim 7, wherein the second communication module supports communication an audible frequency band, an inaudible frequency band, and a visible frequency band.

10. The method of claim 7, further comprising:
activating the second communication module from a deactivated state in response to receiving the initial setting request message.

11. The method of claim 7, further comprising:
in response to receiving the initial setting request message and the security key information, controlling a display to display a pop-up window including a registration setting support user-interface, and a selectable confirmation to execute registration for the external electronic device.

12. The method of claim 7, further comprising:
controlling to transmit, via the security communication channel, subscription support information including at least one of connection information for the network provider to which the external electronic device is connected and account information for the external electronic device.

* * * * *